(12) United States Patent
Chung et al.

(10) Patent No.: US 8,493,178 B2
(45) Date of Patent: Jul. 23, 2013

(54) FORGED FACE DETECTING METHOD AND APPARATUS THEREOF

(75) Inventors: Yun Su Chung, Daejeon (KR); Yongjin Lee, Daejeon (KR); Sung Uk Jung, Daejeon (KR); Ki Young Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 500 days.

(21) Appl. No.: 12/629,011

(22) Filed: Dec. 1, 2009

(65) Prior Publication Data

US 2010/0134250 A1   Jun. 3, 2010

(30) Foreign Application Priority Data

Dec. 2, 2008 (KR) .................. 10-2008-0121025
Mar. 20, 2009 (KR) .................. 10-2009-0023987

(51) Int. Cl.
*G05B 19/00* (2006.01)
(52) U.S. Cl.
USPC ......... 340/5.82; 340/5.81; 340/5.83; 340/5.8; 382/116; 382/118
(58) Field of Classification Search
USPC ................................ 340/5.82, 5.83; 382/115
See application file for complete search history.

(56) References Cited

U.S. PATENT DOCUMENTS

| | | | |
|---|---|---|---|
| 6,940,545 B1 | 9/2005 | Ray et al. | |
| 7,650,020 B2 * | 1/2010 | Monro | 382/115 |
| 2005/0055582 A1 * | 3/2005 | Bazakos et al. | 713/202 |
| 2007/0116364 A1 | 5/2007 | Kleihorst et al. | |
| 2007/0183633 A1 * | 8/2007 | Hoffmann | 382/116 |
| 2007/0189583 A1 * | 8/2007 | Shimada et al. | 382/118 |
| 2008/0238709 A1 * | 10/2008 | Vaziri et al. | 340/825.22 |
| 2009/0001272 A1 * | 1/2009 | Hajjar | 250/354.1 |

FOREIGN PATENT DOCUMENTS

| | | |
|---|---|---|
| JP | 2004-126738 | 4/2004 |
| KR | 1020030091345 A | 12/2003 |
| KR | 1020050059247 A | 6/2005 |
| KR | 1020070081773 A | 8/2007 |
| KR | 1020080037447 A | 4/2008 |

OTHER PUBLICATIONS

Jiangwei Li et al., "Live Face Detection Based on the Analysis of Fourier Spectra," SPIE, Aug. 2004, pp. 296-303, vol. 5404.

\* cited by examiner

*Primary Examiner* — Daniel Wu
*Assistant Examiner* — Frederick Ott

(57) ABSTRACT

A forged face detecting method includes: acquiring a photorealistic image and an infrared image of a subject on which line beams are projected; extracting face features from the infrared image based on characteristics of a pattern of the line beams projected on the acquired infrared image; and detecting whether or not the infrared image is a forged face based on the extracted face features. Said detecting whether or not the infrared image is a forged face includes: checking whether the extracted face features falls within a preset permission range of face features; determining the infrared image to have the forged face if the extracted face features fall out of the range to acquire an infrared image of the subject again; and determining the infrared image to have a non-forged face if the extracted face features falls within the range to perform face recognition for the photorealistic image.

5 Claims, 4 Drawing Sheets

FORGED FACE DETECTING METHOD AND APPARATUS THEREOF

CROSS-REFERENCE(S) TO RELATED APPLICATION(S)

The present invention claims priority of Korean Patent Applications No. 10-2008-0121025, filed on Dec. 2, 2008 and Korean Patent Application No. 10-2009-0023987, filed on Mar. 20, 2009 which are incorporated herein by reference.

FIELD OF THE INVENTION

The present invention relates to a forged face detecting method and apparatus, and more particularly, to a method and apparatus for detecting a forged face by using face features extracted from infrared image.

BACKGROUND OF THE INVENTION

As is well known in the art, a biometrics technique is generally referred to as a method of identifying persons based on their unique physical or morphological features. As various kinds of services through a network are being populated with the development of communication technique, studies on biometrics are actively made for a user authentication.

Such biometrics technique is an individual authentication technique using bio information, such as individual body features or behaviors, which will never be lost or have no need to be memorized. Moreover, since the individual bio information has to be directly input to a biometrics system for authentication, the biometrics technique has a merit of high security over existing technologies using passwords from the view of security. Accordingly, the biometrics technique comes into a spotlight as the next generation technique to replace the existing password and ID card-based individual authentication technologies.

However, the biometrics technique has a problem in that forged bio information, which may be input to a system, deteriorates reliability and security of bio-recognition. Particularly there is a difficulty in distinguishing real bio information from forged bio information by using a typical bio-recognition algorithm.

In addition, in case of conventional face recognition method, although a forged face may be easily distinguished from a non-forged face by using a thermal distribution of a face photographed by a thermal infrared camera, such a thermal infrared camera has a high cost to be applied into a biometrics system. Further, users can feel uncomfortable by a conventional face recognition method making a user to speak or move to input the users' bio information. Furthermore, although there has been proposed a method for determining whether or not a forged face is present by using a degree of variation of an eye area in a face image, this method has also a problem in that it has to premise movement or change of eyes in the face area.

SUMMARY OF THE INVENTION

In view of the above, the present invention provides a method and apparatus for detecting a forged face capable of detecting a forged face by forged face features extracted from an infrared image.

In accordance with an aspect of the present invention, there is provided a forged face detecting method including: acquiring a photorealistic image and an infrared image of a subject's face to be authenticated on which line beams are projected; extracting face features from the infrared image based on characteristics of a pattern of the line beams projected on the acquired infrared image; and detecting whether or not the infrared image is a forged face based on the extracted face features.

In accordance with another aspect of the present invention, there is provided a forged face detecting apparatus including: a beam projection unit for projecting line beams on a subject's face to be authenticated; an image acquisition unit for acquiring a photorealistic image and an infrared image of the subject on which the line beams are projected; an infrared image processing unit for extracting face features based on characteristics of a linear pattern of the line beams projected on the infrared image; and a forged face detection unit for checking whether the extracted face features fall within a preset permission range of face features to detect whether or not the infrared image is a forged face.

In accordance with the aspects the present invention, it is possible to improve security and reliability of a face recognition system since it can perform a face recognition, i.e., a user authenticating operation, only when the subject is detected to be not a forged face, by projecting the line beam on the subject at regular intervals by means of the line projector, extracting the forged face features from the infrared image of the subject on which the series of line beams is projected, with the subject photographed by the infrared camera, and detecting the forged face based on the extracted forged face features.

In addition, the forged face detecting method and apparatus of the present invention has an advantage in that it is capable of discriminating a non-forged face from a forged face such as a photograph made by a still camera, thereby preventing the forged face from being illegally used in a face recognition system.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
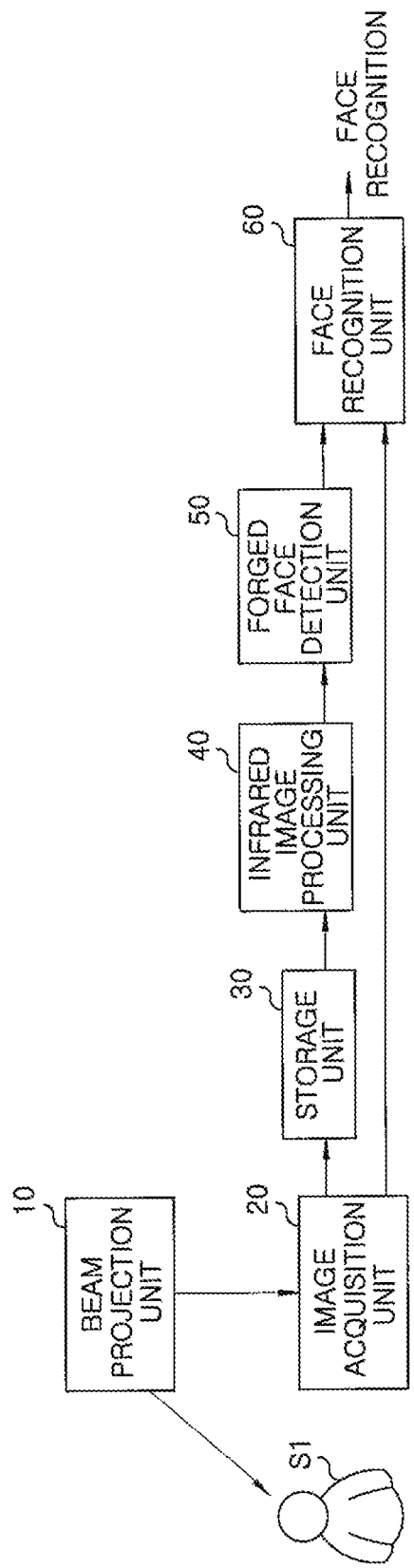
FIG. 1 is a block diagram of a forged face detecting apparatus in accordance with an embodiment of the invention.

FIG. 1 is a block diagram of a forged face detecting apparatus in accordance with an embodiment of the invention. The apparatus includes a beam projection unit 10, an image acquisition unit 20, a storage unit 30, an infrared image processing unit 40, a forged face detection unit 50 and a face recognition unit 60.

The beam projection unit 10 is an example of a line projector which projects a series of invisible line beams on a subject S0 at regular intervals and provides the image acquisition unit 20 with a projection signal indicating the fact that the series of line beams is being projected on the subject. In this regard, the subject may be a user's face to be authenticated.

Figure 2:
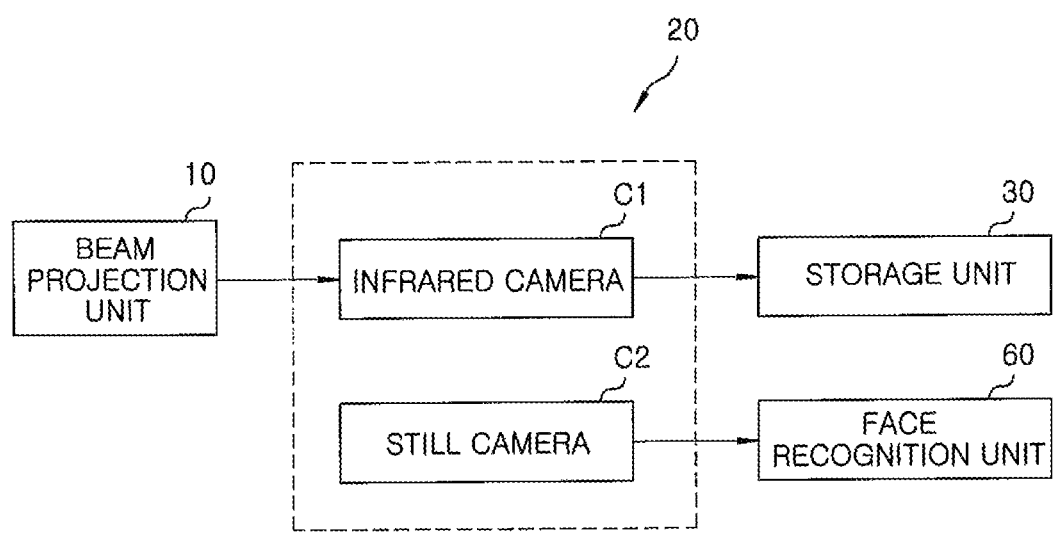
FIG. 2 is a detailed block diagram of an image acquisition unit shown in FIG. 1.

The image acquisition unit 20 includes an infrared camera C1 for acquiring an infrared image of the subject S0 to be used in forged face detection and a still camera C2 for acquiring photorealistic image of the subject C1, as shown in FIG. 2.

Upon receiving the projection signal from the beam projection unit 10, the infrared camera C1 initiates to acquire an infrared image of the subject by photographing the subject on which the series of line beams are projected. The infrared image is then provided to the storage unit 30 for the storage thereof.

The still camera C2 photographs the subject S0 to obtain a photorealistic image to provide the acquired photorealistic image to the face recognition unit 60.

The storage unit 30 stores the infrared image of the subject from the infrared camera C1. Further, in the storage unit 30, a predetermined permission range of a face feature value has been stored. The permission range of the face feature value becomes a standard for determining whether the infrared image has a forged face or not.

The infrared image processing unit 40 extracts face features from the infrared image based on characteristics of a beam pattern on the infrared image. According to the present invention, the characteristics of the beam pattern may be obtained form an entire area of the infrared image, or a particular area of the infrared image (e.g., entire image, an area around a central point of the image or an area around a contour of the face) and provides the extracted face features to the forged face detection unit 50.

The forged face detection unit 50 determines whether or not the face feature extracted by the infrared image processing unit 40 falls in the permission range of face features. If it is determined that the extracted face features fall out of the range, the forged face detection unit 50 determines that the infrared image is a forged face. On the other hand, if the extracted face features fall within the range, the forged face detection unit 50 determines that the infrared image is a non-forged face. After the determination process, the forged face detection unit 50 provides the determined result to the face recognition unit 60.

The face recognition unit 60 performs face recognition for the photorealistic image input from the image acquisition unit 20 when the face image has been determined to be non-forged face by the forged face detection unit 50. When, however, the face image has been determined to be the forged face, the infrared camera C1 and the still camera C2 are controlled to photograph the subject again to check whether the determination result is correct or not.

With the above configuration, the forged face detecting apparatus in accordance with the present invention can improve security and reliability of the face recognition system since it can perform the face recognizing operation, i.e., a user authenticating operation, only when the subject is determined to be a non-forged face, based on the face features extracted from the infrared image which is obtained by photographing the subject by the infrared camera while projecting the line beams thereon.

Next, a forged face detecting method in accordance with the embodiment of the present invention will be described.

Figure 3:
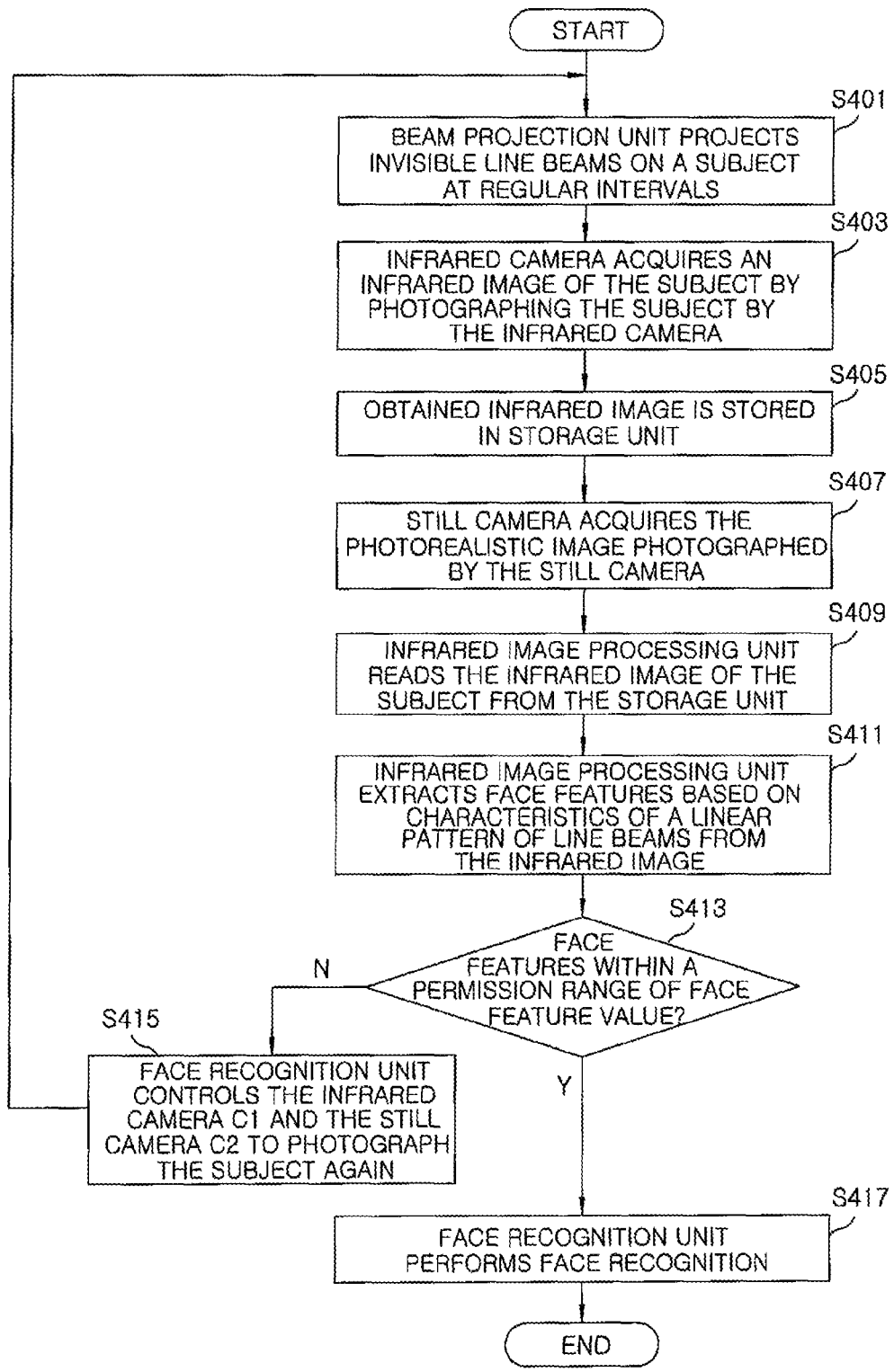
FIG. 3 is a flowchart showing a forged face detecting method in accordance with the embodiment of the invention.

FIG. 3 is a flowchart showing a forged face detecting method for detecting a forged face in a sequential manner in accordance with the embodiment of the invention.

First, the beam projection unit 10, as the line projector, projects the series of invisible line beams on the subject S0 at regular intervals at step S401 to provide the infrared camera C1 in the image acquisition unit 20 with the projection signal indicating the fact that the series of line beams is being projected on the subject S0.

Figure 4:
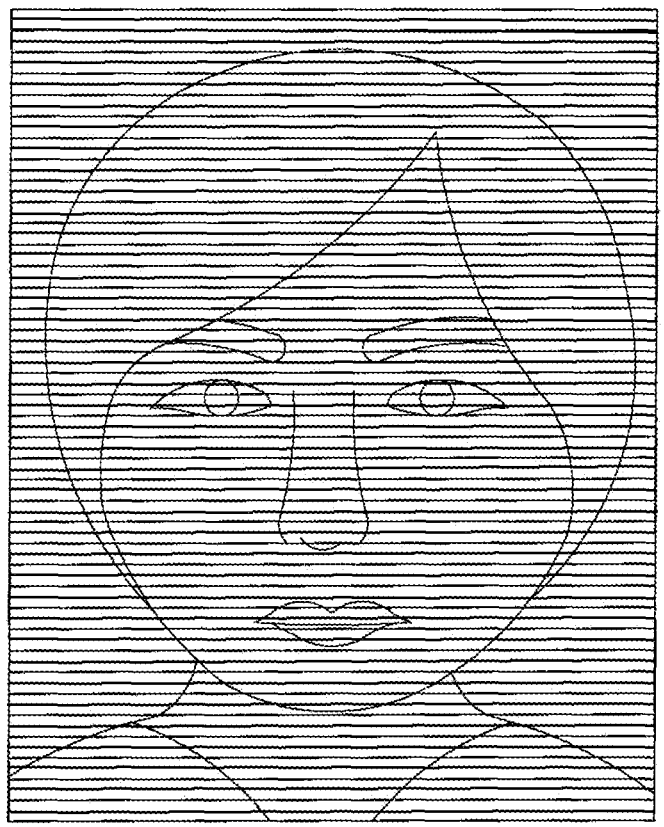
FIG. 4 is a photograph of an infrared image of a subject on which a series of line beams acquired by the image acquisition unit shown in FIG. 1 is projected.

When the projection signal is input, the infrared camera 21 acquires an infrared image of the subject by photographing the subject by the infrared camera C1 while the series of line beams is projected thereon, as shown in FIG. 4 at step S403

Then the obtained infrared image is stored in the storage unit 30 at step S405.

Then, the still camera C2 acquires the photorealistic image photographed by the still camera C2 at step S407 to provide the acquired photorealistic image to the face recognition unit 60.

Then, the infrared image processing unit 40 reads the infrared image of the subject from the storage unit 30 at step S409 and extracts face features based on characteristics of a linear pattern of the series of line beams from a particular area of the infrared image (e.g. around a contour of the face image) at step S411 to provide the extracted face features to the forged face detection unit 50.

Next, the forged face detection unit 50 determines whether or not the face features input from the infrared image processing unit 40 falls in a permission range of face feature value and the determination result is transmitted to the face recognition unit 60 at step S413.

At step S413, if the value falls out of the range, the forged face detection unit 50 determines that the infrared image is a forged face. Meanwhile, if the value falls within the range, the forged face detection unit 50 determines that the infrared image is a non-forged face. Then, the face recognition unit 60 controls the infrared camera C1 and the still camera C2 to photograph the subject again in case where it has been determined that the infrared image is the forged face at step S413, or the face recognition unit 60 at step S415, or the face recognition unit 60 performs a face recognition for the photorealistic image input from the image acquisition unit 20 in case where it has been determined that the infrared image is the non-forged face at the same step, at step S417.

As described above, the present invention provides the forged face detecting method and apparatus which is capable of distinguishing a non-forged face from a forged face such as a photograph made by a still camera, thereby preventing the forged face from being illegally used in a face recognition system.

While the invention has been shown and described with respect to the preferred embodiments, it will be understood by those skilled in the art that various changes and modifications may be made without departing from the scope of the invention as defined in the following claims.

What is claimed is:

1. A forged face detecting method comprising:
    storing a predetermined permission range of a face feature value;
    projecting line beams onto a subject's face to cover a contour of the subject's face;
    acquiring a photorealistic image and an infrared image of the subject's face on which line beams are projected;
    extracting a face feature value from the infrared image based on characteristics of a pattern of the line beams projected on the user's face that are present in the acquired infrared image;
    checking whether the extracted face feature value falls within the predetermined permission range;
    if the extracted face feature value falls outside of the predetermined permission range, determining the infrared image to have the forged face and acquiring an infrared image of the subject again; and if the extracted face feature value falls within the predetermined permission range, determining the infrared image to have a non-forged face and performing a face recognition with the photorealistic image; and performing facial recognition using the photorealistic image; and wherein said extracting face features includes extracting face features based on characteristics of a linear pattern for at least one of the entire image, a particular area around a central point of the image, and an area around a subject contour.

2. The method of claim 1, wherein the line beams are invisible beams projected on the subject at regular intervals.

3. A forged face detecting apparatus comprising:

a storage unit that stores a predetermined permission range of a face feature value;

a beam projection unit configured to project line beams covering a contour of a subject's face to be authenticated;

an image acquisition unit configured to acquire a photorealistic image and an infrared image of the subject on which the line beams are projected;

an infrared image processing unit configured to extract a face feature value based on characteristics of a linear pattern of the line beams covering the contour of the subject's face in the infrared image;

a forged face detection unit configured to check whether the extracted face feature value falls within the predetermined permission range to detect whether or not the infrared image is a forged face; and a face recognition unit configured to perform facial recognition using the photorealistic image, wherein if the extracted face feature value falls outside of the predetermined permission range, determining the infrared image to have the forged face and acquiring an infrared image of the subject again, and if the extracted face feature value falls within the predetermined permission range, determining the infrared image to have a non-forged face and performing a face recognition with the photorealistic image; and wherein the infrared image processing unit is configured to extract a face feature value based on characteristics of a linear pattern for the entire image, a particular area around a central point of the image or an area around a subject contour.

4. The apparatus according to claim 3, wherein the image acquisition unit includes:

an infrared camera configured to acquire the infrared image; and a still camera configured to acquire the photorealistic image of the subject.

5. The apparatus of claim 3, wherein the beam projection unit is a line projector which projects invisible beams on the subject at regular intervals.

* * * * *